(12) United States Patent
Michifuji et al.

(10) Patent No.: US 11,159,690 B2
(45) Date of Patent: Oct. 26, 2021

(54) IMAGE FORMING APPARATUS

(71) Applicant: FUJIFILM Business Innovation Corp., Tokyo (JP)

(72) Inventors: Hiroki Michifuji, Kanagawa (JP); Ayana Nomura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/941,555

(22) Filed: Jul. 29, 2020

(65) Prior Publication Data

US 2021/0289079 A1 Sep. 16, 2021

(30) Foreign Application Priority Data

Mar. 12, 2020 (JP) .............................. JP2020-042689

(51) Int. Cl.
*H04N 1/00* (2006.01)
(52) U.S. Cl.
CPC ....... *H04N 1/0049* (2013.01); *H04N 1/00323* (2013.01); *H04N 1/00633* (2013.01); *H04N 2201/0094* (2013.01)

(58) Field of Classification Search
CPC ............. H04N 1/0049; H04N 1/00323; H04N 1/00633; H04N 2201/0094; H04N 1/00697; H04N 1/00771; B41J 13/106
See application file for complete search history.

(56) References Cited

U.S. PATENT DOCUMENTS

2019/0208069 A1* 7/2019 Hwang .............. H04N 1/00633
2019/0373127 A1* 12/2019 Tsuji .................. G03G 15/5016

FOREIGN PATENT DOCUMENTS

JP H06191128 7/1994

* cited by examiner

*Primary Examiner* — Iriana Cruz
(74) *Attorney, Agent, or Firm* — JCIPRNET

(57) ABSTRACT

An image forming apparatus includes a first ejection destination to which a recording medium is ejected, and a second ejection destination disposed at a position which is less visually recognized from a surrounding user than the first ejection destination; a memory; and a processor configured to perform control to turn on a first light emitting unit disposed at a position where a visually recognizable range from surroundings is wider than the second ejection destination, in a case where a recording medium ejected to the second ejection destination is left.

14 Claims, 14 Drawing Sheets

IN A CASE WHERE ONLY LED 22 OF SIDE TRAY 42 IS TURNED ON

IN A CASE WHERE ONLY LED 22 OF SIDE TRAY 42 IS TURNED ON

FIG. 8

EXAMPLE OF ON CONTROL SETTING OF FORGETTING-TO-TAKE PREVENTING LED

| CONTROL SETTING / LED TO BE CONTROLLED | INVALID | CENTER TRAY | SIDE TRAY |
|---|---|---|---|
| CENTER TRAY LED | | | O |
| SIDE TRAY LED | | | O |
| OPERATION PANEL LED | O | | |

FIG. 12

EXAMPLE OF ON CONTROL SETTING OF FORGETTING-TO-TAKE PREVENTING LED

| CONTROL SETTING / LED TO BE CONTROLLED | INVALID | CENTER TRAY | SIDE TRAY |
|---|---|---|---|
| CENTER TRAY LED | | | O |
| SIDE TRAY LED | | | O |
| OPERATION PANEL LED | | | O |

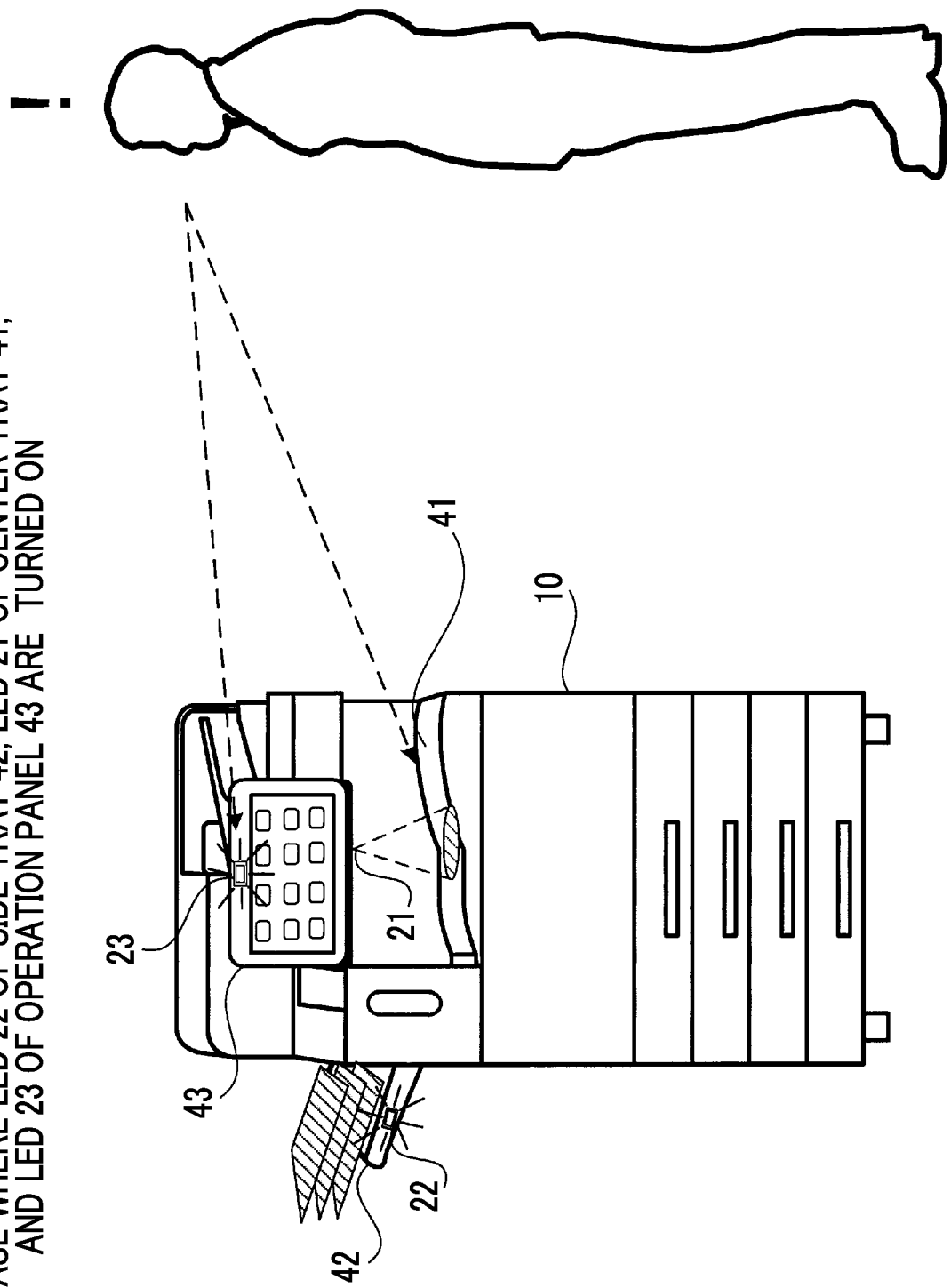

IMAGE FORMING APPARATUS

CROSS-REFERENCE TO RELATED APPLICATIONS

This application is based on and claims priority under 35 USC 119 from Japanese Patent Application No. 2020-042689 filed Mar. 12, 2020.

BACKGROUND

(i) Technical Field

The present invention relates to an image forming apparatus.

(ii) Related Art

JP1994-191128A discloses a network printer in which each of a plurality of paper ejection trays is provided with a detection unit that detects the presence or absence of ejected recording paper, and in a case where the detection unit detects the recording paper on a paper ejection tray, an LED corresponding to the paper ejection tray where the recording paper is detected, and a user is notified of the paper ejection tray to which the recording paper has been ejected.

SUMMARY

Aspects of non-limiting embodiments of the present disclosure relate to an image forming apparatus that allows a surrounding user to easily notice that an ejected recording medium is left at an ejection destination disposed at a position where the ejection destination is less visually recognized from the surrounding user among the plurality of ejection destinations compared to a case where a light emitting unit provided at the ejection destination is turned on.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a first ejection destination to which a recording medium is ejected, and a second ejection destination disposed at a position which is less visually recognized from a surrounding user than the first ejection destination; a memory; and a processor configured to perform control to turn on a first light emitting unit disposed at a position where a visually recognizable range from surroundings is wider than the second ejection destination, in a case where a recording medium ejected to the second ejection destination is left.

BRIEF DESCRIPTION OF THE DRAWINGS

Exemplary embodiment(s) of the present invention will be described in detail based on the following figures, wherein:

FIG. 8 is a view illustrating an example of setting information stored in a setting information storage unit 52 illustrated in FIG. 6;

FIG. 12 is a view illustrating another example of the setting information stored in the setting information storage unit 52 illustrated in FIG. 6;

FIG. 14 is a view for explaining a state in which the LED 22 of the side tray 42, the LED 21 of the center tray 41, and the LED 23 of the operation panel 43 are turned on in a case where paper is left on the side tray 42.

DETAILED DESCRIPTION

Next, exemplary embodiments of the present invention will be described in detail with reference to the drawings.

Figure 1:
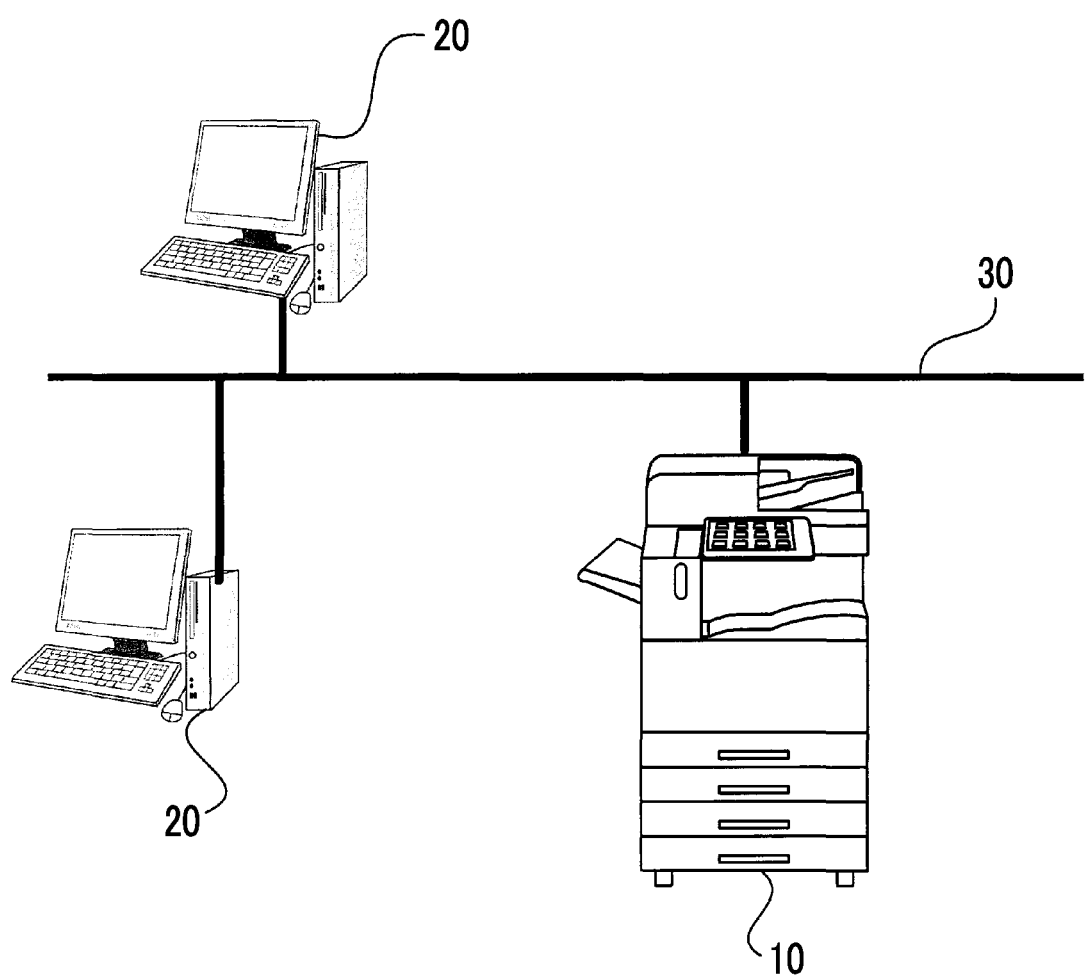
FIG. 1 is a view illustrating a system configuration of an image forming system according to an exemplary embodiment of the present invention.

FIG. 1 is a view illustrating a system configuration of an image forming system according to an exemplary embodiment of the present invention.

As illustrated in FIG. 1, the image forming system according to the exemplary embodiment of the present invention includes an image forming apparatus 10 and a terminal device 20 that are mutually connected by a network 30. The terminal device 20 generates print data and transmits the generated print data to the image forming apparatus 10 via the network 30. The image forming apparatus 10 receives the print data transmitted from the terminal device 20, and outputs an image corresponding to the print data onto paper. In addition, the image forming apparatus 10 is an apparatus referred to as a so-called multifunction machine having a plurality of functions such as a print function, a scan function, a copy function, and a facsimile function.

Next, the configuration of respective parts of the image forming apparatus 10 illustrated in FIG. 1 will be described with reference to FIG. 2.

Figure 2:
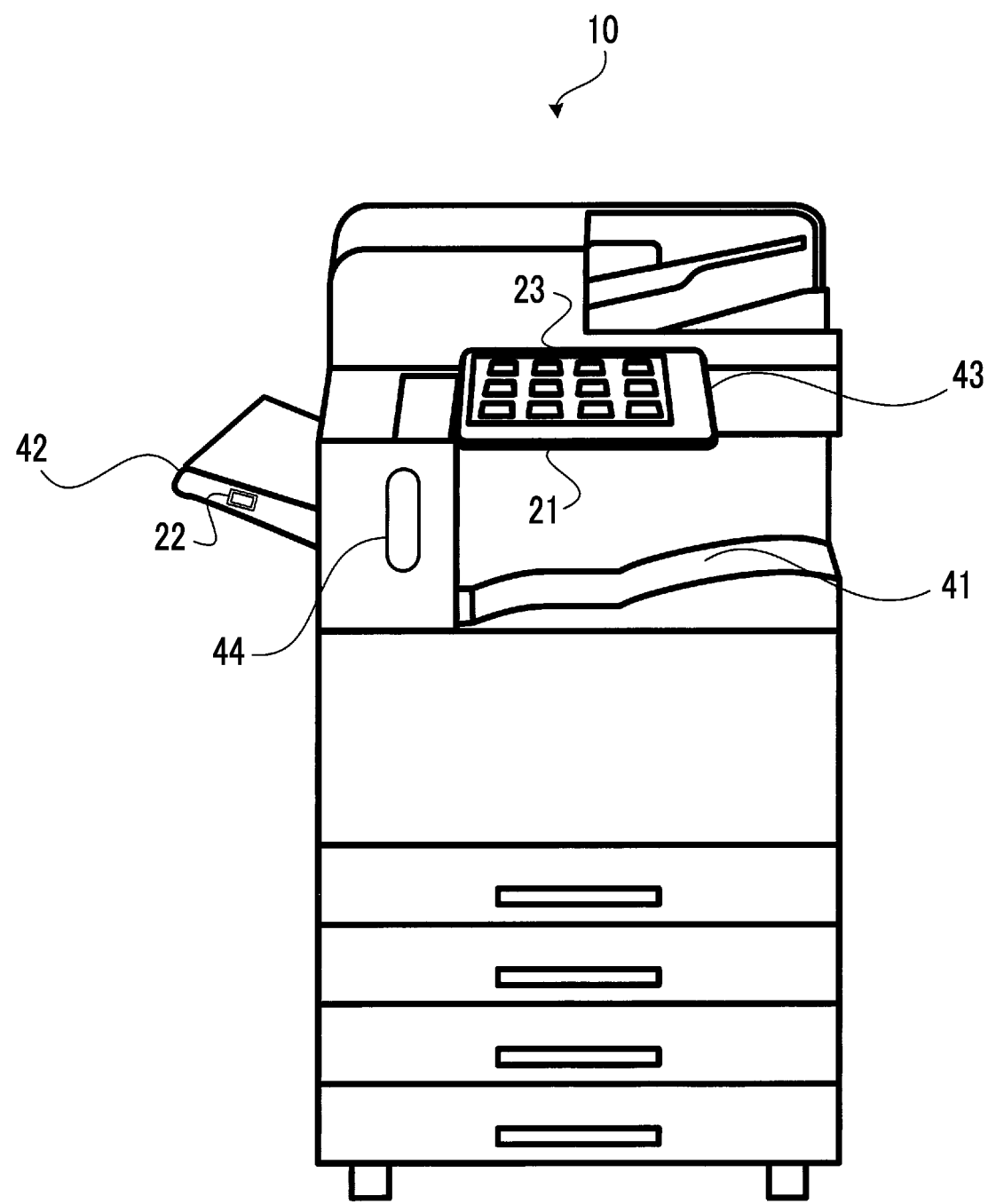
FIG. 2 is a view for explaining a configuration of respective parts of the image forming apparatus 10 illustrated in FIG. 1.

As illustrated in FIG. 2, the image forming apparatus 10 according to the present exemplary embodiment includes two ejection destinations, a center tray 41 and a side tray 42, as ejection destinations for ejecting a recording medium such as paper on which printing is performed.

Here, the center tray 41 is an ejection tray which is disposed between an apparatus body part and an image reader on a central axis of the apparatus and on which a recording medium such as paper is ejected, and corresponds to a first ejection destination. Also, the side tray 42 is an ejection tray that is provided on a side surface of the apparatus and corresponds to a second ejection destination. Normally, although the side tray 42 is not mounted on the image forming apparatus 10 and can be added as an option at the request of the user, there is an apparatus on which the side tray 42 is mounted as a standard.

Here, in the case of the method of using a FAX for printing and outputting without any change in a case where the FAX is received, and in a case where the received FAX is ejected to the center tray 41, there is a risk that the user who has performed copying or printing may mistakenly take the FAX away, and the received FAX paper may be lost.

For that reason, by adding the side tray 42 to the image forming apparatus 10 so as to include two ejection trays, that is, the center tray 41 and the side tray 42, it is possible to perform setting in which an ejection destination is changed depending on the type of print job such that the paper ejected on the basis of the FAX reception is ejected to the side tray 42 and the paper ejected in a case where copying or printing has been performed is ejected to the center tray 41.

Additionally, in the image forming apparatus 10 of the present exemplary embodiment, as illustrated in FIG. 2, an operation panel 43 for allowing the user to perform various operations and a distance measuring sensor 44 for determining whether or not the user is present in front of the apparatus are provided.

Here, the distance measuring sensor 44 is a sensor capable of measuring a distance from an adjacent object, and has a configuration capable of measuring a distance from a user present on a front surface of the apparatus.

Also, the side surface of the side tray 42 is provided with the LED 22, and a control is performed such that the LED 22 blinks while the paper is being ejected to the side tray 42, so that the user can grasp that the ejection to the side tray 42 is performed. The LED 22 corresponds to a second light emitting unit.

Figure 3:
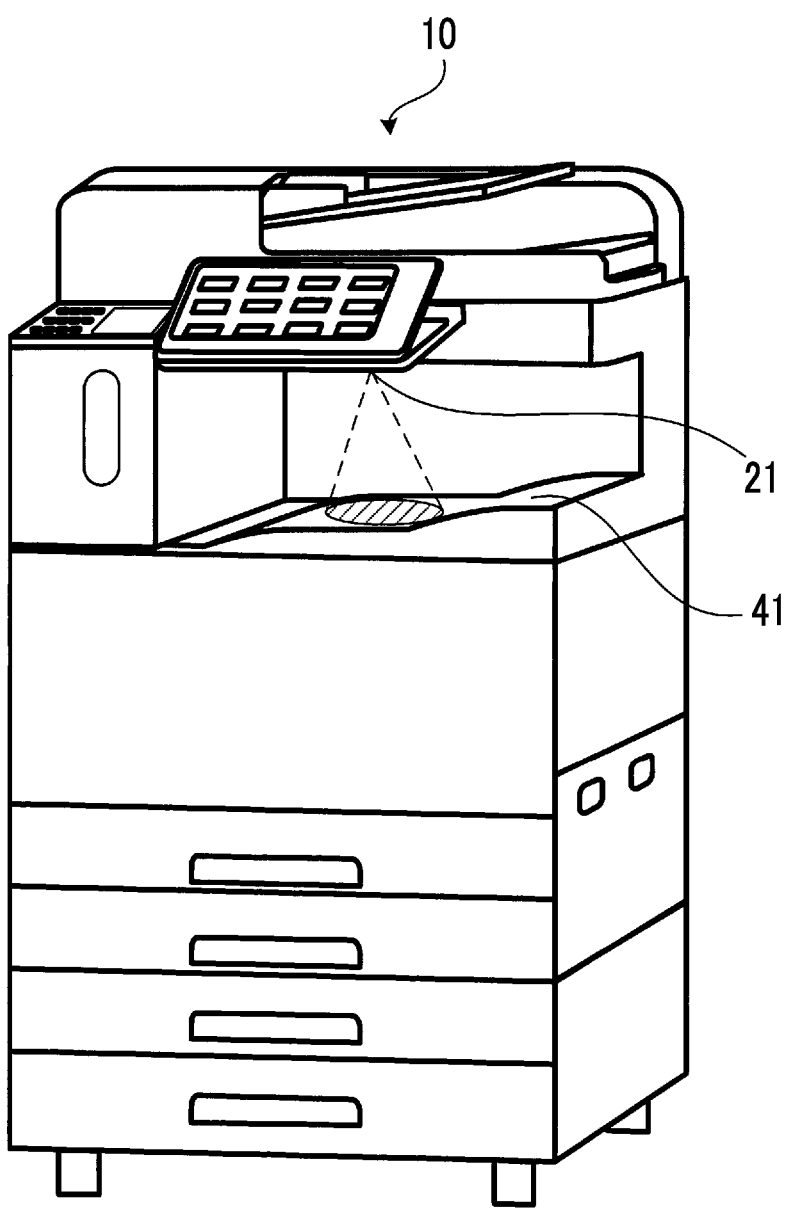
FIG. 3 is a view illustrating a state in which an LED 21 provided on a center tray 41 is turned on and the center tray 41 is irradiated.

Additionally, similarly, the LED 21 is provided directly above the center tray 41, and a control is performed such that the LED 21 blinks during ejection to the center tray 41, so that the user can grasp that the ejection to the center tray 41 is performed. FIG. 3 illustrates a state in which the LED 21 is turned on and the center tray 41 is irradiated. The LED 21 corresponds to a first light emitting unit.

Figure 4:
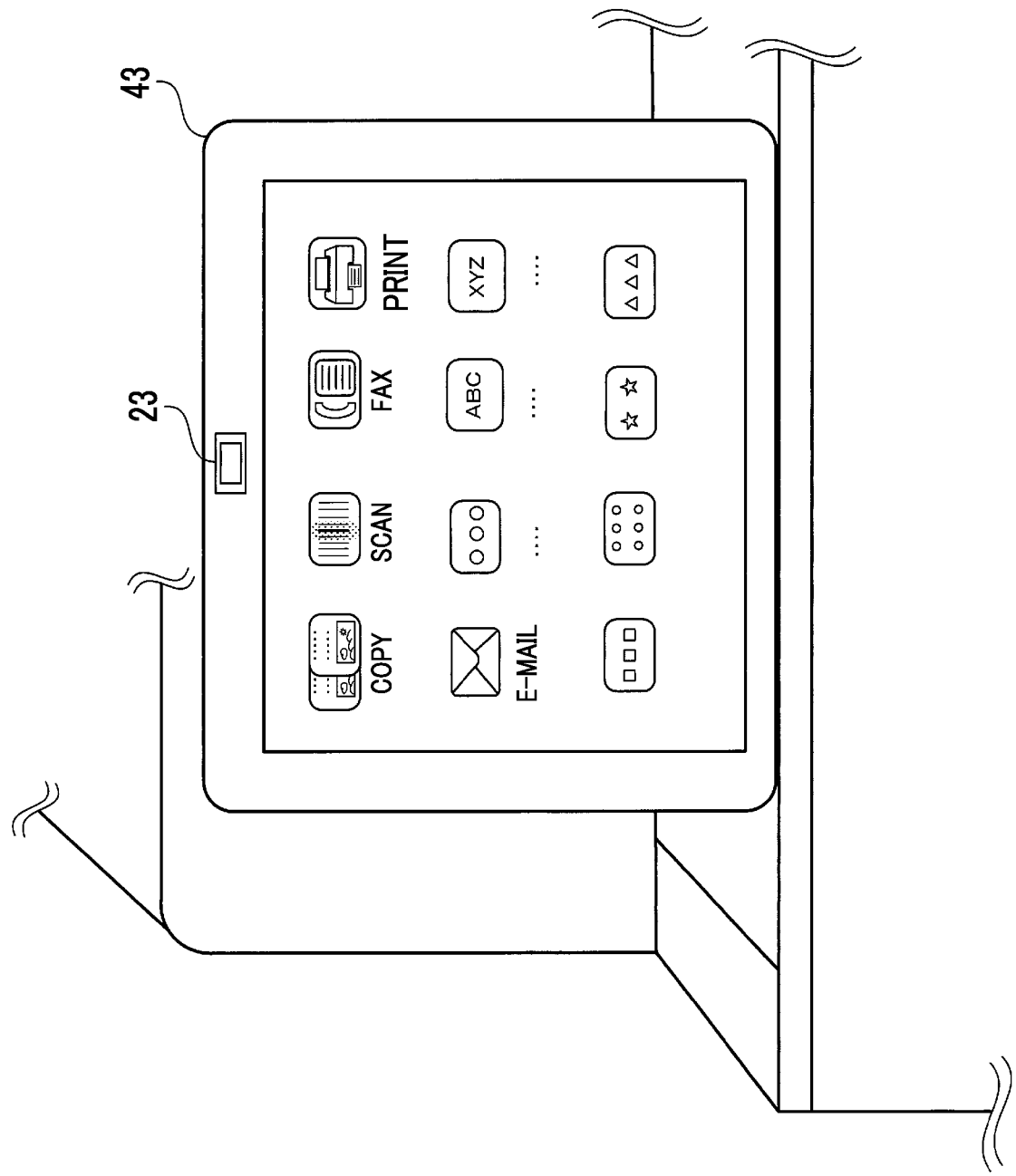
FIG. 4 is a view illustrating a LED 23 provided on an upper part of an operation panel 43.

Moreover, as illustrated in FIG. 4, the LED 23 is also provided on the upper part of the operation panel 43, so that ON/OFF can be controlled. In addition, the operation panel 43 is provided with a tilt mechanism and has a structure capable of adjusting the angle. In addition, the LED 23 may be provided not on the upper part of the operation panel 43 but on a lower part, a side part, or an outer frame part of the operation panel 43. The LED 23 corresponds to a third light emitting unit.

By controlling such LEDs 21 to 23, for example, in a case where the ejected paper is left on the center tray 41, the LED 21 is kept being turned on, and in a case where the ejected paper is left on the side tray 42, the user can be notified of forgetting to take the paper by keeping the LED 22 being turned on.

However, since the side tray 42 is provided on the side surface of the apparatus, the side tray 42 is disposed at a position where the side tray 42 is more visually recognized from a surrounding user than the center tray 41. Additionally, since the side tray 42 is provided on the left side surface of the apparatus, the side tray 42 is provided at a position where the side tray cannot be visually recognized by a user at a specific position on the right side of the apparatus.

Figure 5:
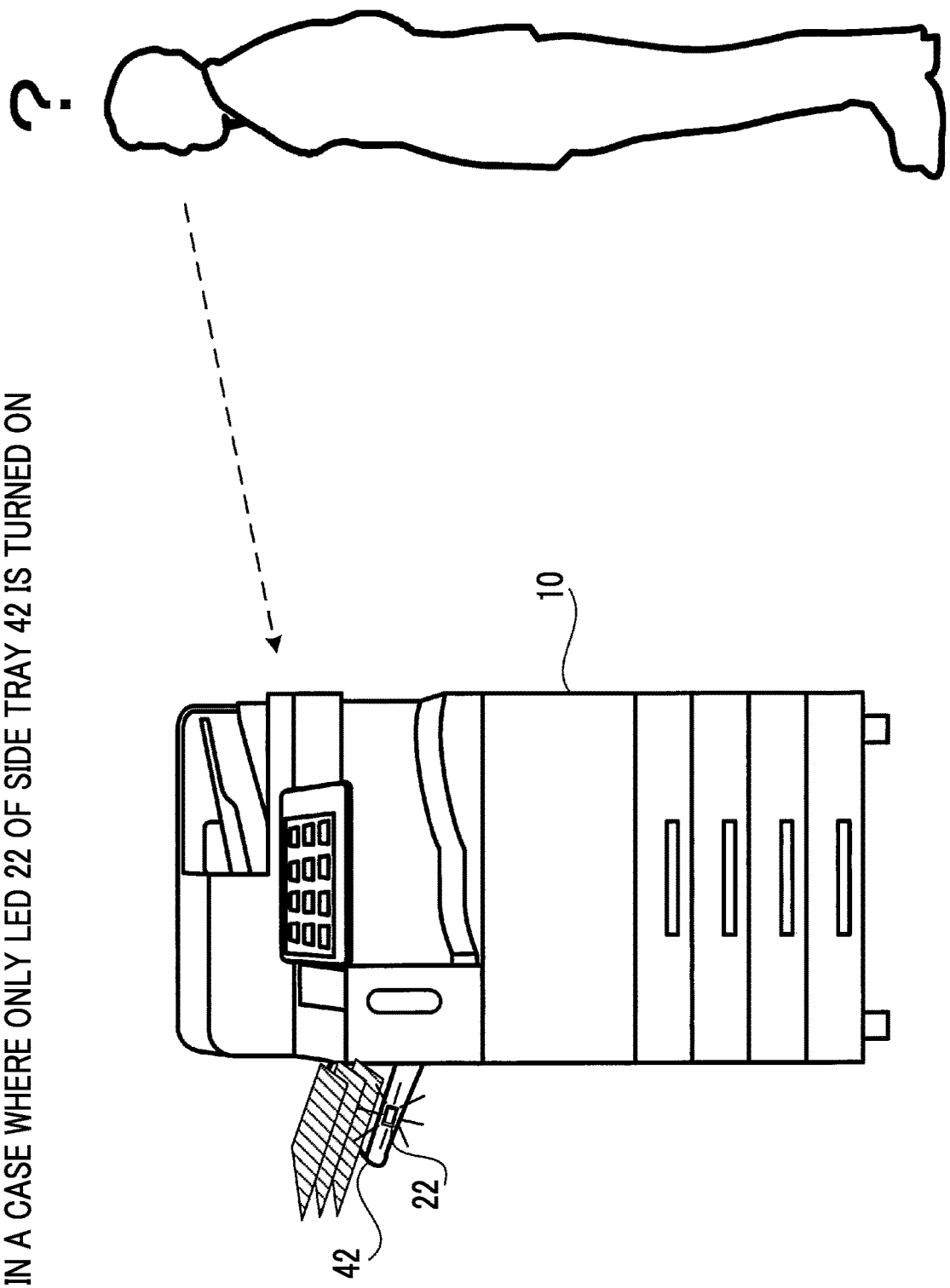
FIG. 5 is a view illustrating a state in a case where only the LED 22 is turned on in a case where paper is left on a side tray 42.

For that reason, as illustrated in FIG. 5, even in a case where the LED 22 is turned on to notify the user of the fact that the user has forgotten to take the paper in a case where the paper is left on the side tray 42, the surrounding user, particularly, a user on a side opposite to a side where the side tray 42 is provided cannot notice the paper on the side tray 42 and ON of the LED 22.

Thus, in the image forming apparatus 10 of the present exemplary embodiment, by adopting the following configuration, the surrounding user can notice that the ejected paper is left on the side tray 42 disposed at a position where the side tray 42 is less visually recognized from a surrounding user out of two ejection destinations including the center tray 41 and the side tray 42.

First, a hardware configuration for performing ON control of the LEDs 21 to 23 in the image forming apparatus 10 of the present exemplary embodiment will be described with reference to FIG. 6.

An apparatus control unit 50 controls various operations of the image forming apparatus 10. In addition, in the following description, only the configuration related to the ON control of the LEDs 21 to 23 in the apparatus control unit 50 will be described.

Figure 6:
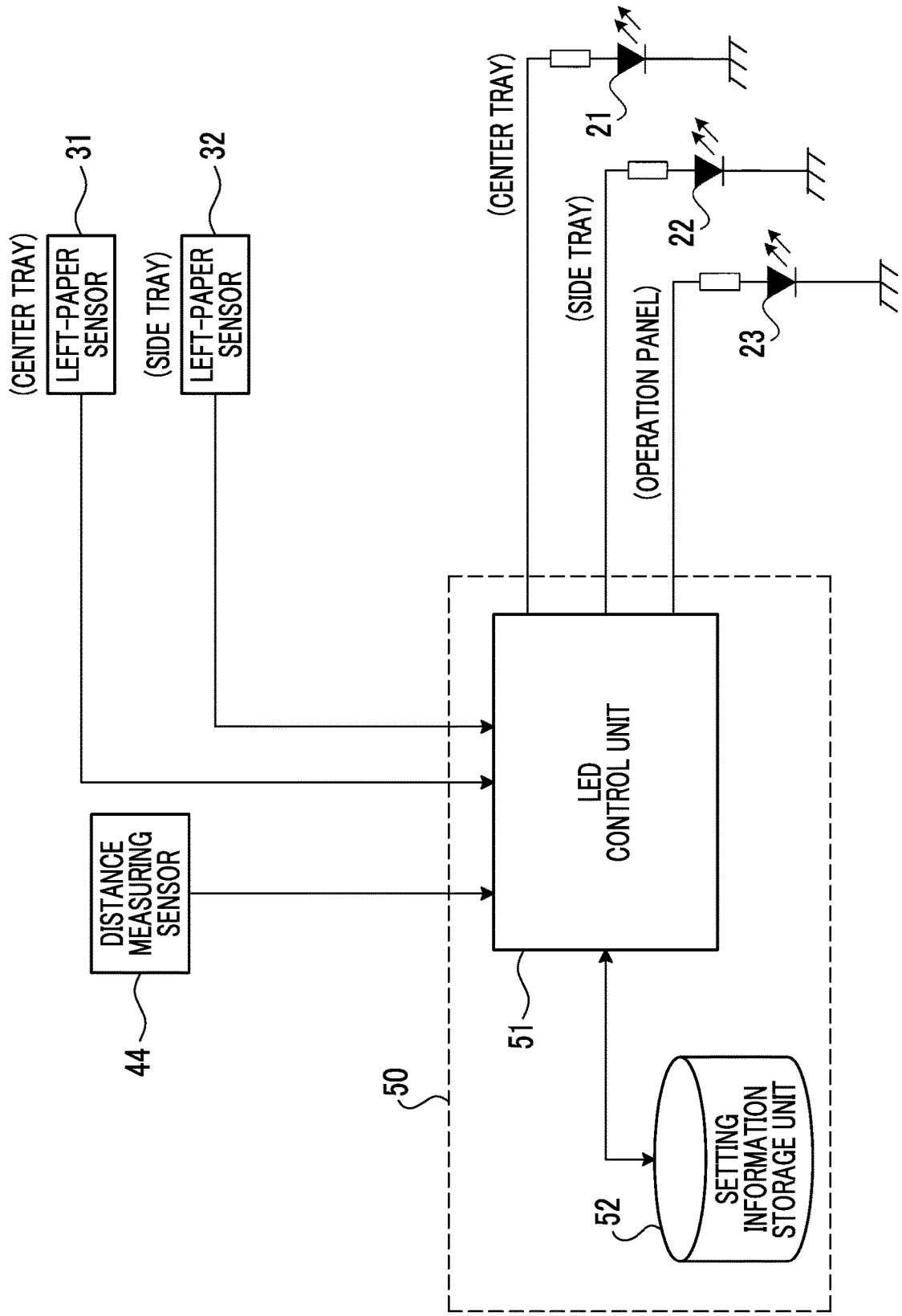
FIG. 6 is a view for explaining a hardware configuration for performing ON control of LEDs 21 to 23 in the image forming apparatus 10 according to the exemplary embodiment of the present invention.

As illustrated in FIG. 6, the apparatus control unit 50 includes an LED control unit 51 for controlling ON/OFF of the LEDs 21 to 23, and a setting information storage unit 52.

The setting information storage unit 52 stores, as the setting information, setting contents of the user in a case where the ON/OFF of the LEDs 21 to 23 is controlled. In addition, the details of this setting information will be described below.

The LED control unit 51 controls the ON/OFF of the LEDs 21 to 23 on the basis of a left-paper sensor 31 provided in the center tray 41, a left-paper sensor 32 provided in the side tray 42, a detection signal from the distance measuring sensor 44, and the setting information stored in the setting information storage unit 52.

For example, in a case where a setting is performed such that both the LEDs 21 and 22 are turned on in a case where the paper is left on the side tray 42, the LED control unit 51 performs a control so as to turn on the LED 21 of the center tray 41 disposed at a position where a visually recognizable range from the surroundings is wider than the side tray 42 in a case where the ejected paper is left on the side tray 42. Moreover, in a case where the ejected recording medium is left on the side tray 42, the LED control unit 51 turns on the LED 22 together with the LED 21.

Here, the LED control unit 51 may turn on the LED 21 and the LED 22 in the same ON mode, or may turn on the LEDs in different ON modes. For example, the LED control unit 51 may blink the LED 21 at regular intervals and turn on the LED 22 with the same light amount. Changing the ON mode in this way means that the paper is left in an ejection destination where the LED blinks, and the fact that the LED is brought into an ON state means that the paper is left in any ejection destination irrespective of whether the printing processing is completed.

Additionally, in a case where a setting is performed such that all the LEDs 21, 22, 23 are turned on in a case where the paper is left on the side tray 42, the LED control unit 51 turns on the LED 23 provided on the operation panel 43 in a case where a preset time, for example, 30 seconds has elapsed in a state where the paper is ejected to the side tray 42.

In a case where such a control is performed, the LED control unit 51 may turn off the LED 21 in a case where the LED 23 is turned on. This is because it is considered that, since the LED 23 provided on the operation panel 43 is disposed at a higher position than the LED 21 of the center tray 41 and can be visually recognized by a user farther away therefrom, easy visual recognition by the user does not change much even in a case where the LED 21 is turned off as long as the LED 23 is turned on.

Additionally, in a case where the ON mode of an LED is changed depending on the time after the paper is ejected to the side tray 42 as described above, in a structure in which the ON color of the LED can be changed, the ON color may be changed depending on the time after the paper is ejected such that the LED is turned on in yellow immediately after the paper is ejected and the LED is switched to red in a case where the preset time has elapsed.

Moreover, the LED control unit 51 may perform a control such that the LED 21 of the center tray 41 is not turned on even in a case where the paper is left on the side tray 42 in a case where the distance measuring sensor 44 has detected that the user is present within a preset distance from the apparatus.

The reason why the control is performed in this way is that it is considered that, as long as the paper is left on the side tray 42, the user notice the situation because the fact that the distance measuring sensor 44 detects the user in the vicinity of the apparatus means that the user can regard the side tray 42 to be at a visually recognizable position.

Figure 7:
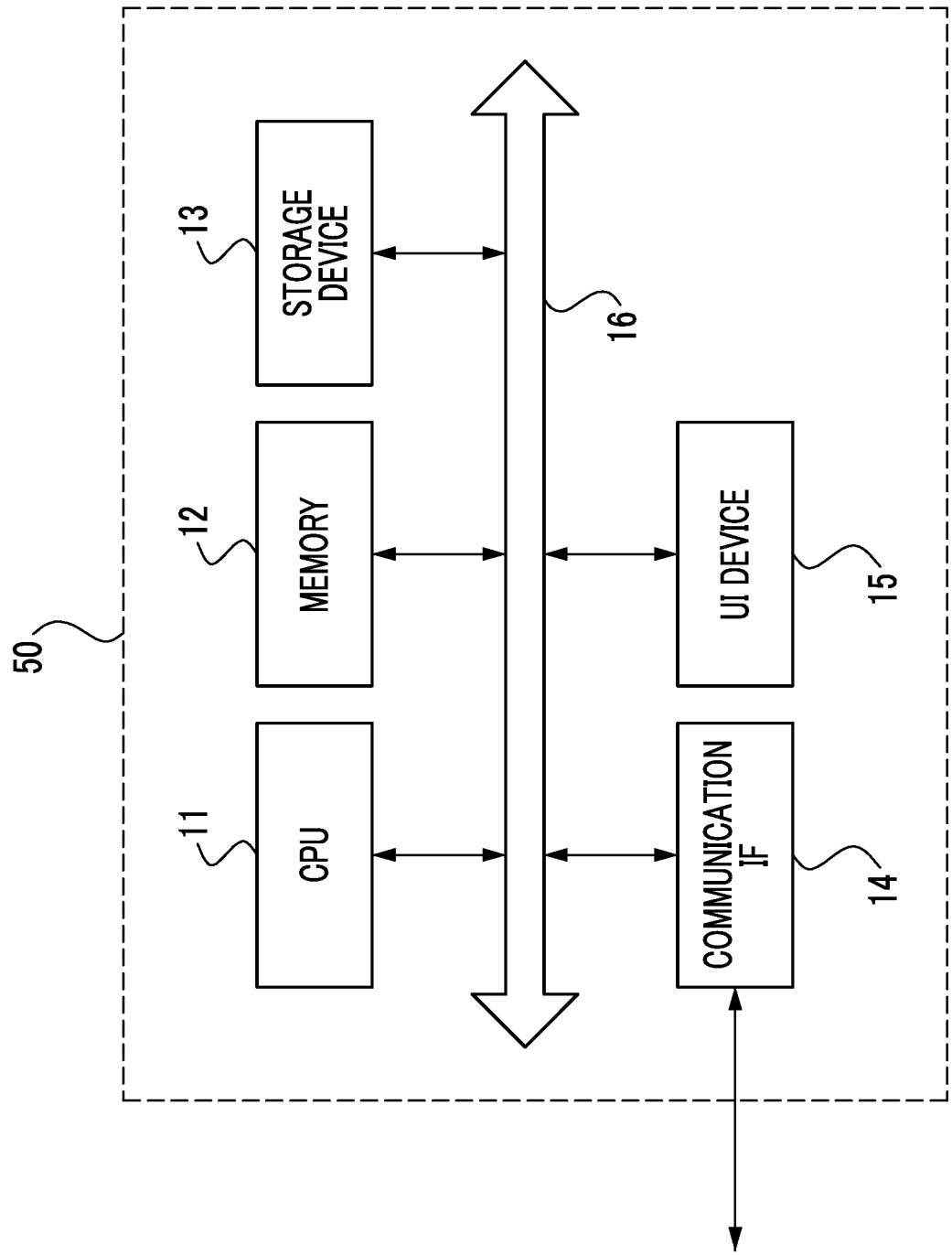
FIG. 7 is a view for explaining a hardware configuration of an apparatus control unit 50 illustrated in FIG. 6.

Next, a hardware configuration of the apparatus control unit 50 illustrated in FIG. 6 will be described with reference to FIG. 7. As illustrated in FIG. 7, the apparatus control unit 50 includes a CPU 11, a memory 12, a storage device 13 such as a hard disk drive, a communication interface (abbreviated as IF) 14 that performs transmission and reception of data with an external device or the like, and a user interface (abbreviated as UI) 15 including a touch panel or a liquid crystal display and a keyboard. These components are connected to each other via a control bus 16.

The CPU 11 is a processor that executes predetermined processing on the basis of a control program stored in the memory 12 or the storage device 13 to control the operation of the image forming apparatus 10. In addition, in the present exemplary embodiment, the CPU 11 is described as reading and executing the control program stored in the memory 12 or the storage device 13. However, the CPU 11 can also store the program in a storage medium such as a CD-ROM to provide the program.

The apparatus control unit 50 having such a configuration realizes a functional configuration illustrated in FIG. 6.

Next, FIG. 8 illustrates an example of the setting information stored in the setting information storage unit 52 illustrated in FIG. 6. FIG. 8 illustrates an example of setting information indicating the setting contents of a forgetting-to-take preventing LED ON control.

Here, in FIG. 8, the setting of turning on the LED 21 of the center tray 41 in a case where paper is left on the side tray 42 instead of the center tray 41 is performed. Additionally, the setting of turning on the LED 22 of the side tray 42 in a case where paper is left on the side tray 42 is performed. Also, the LED 23 of the operation panel 43 is set to "invalid" so that the LED 23 is not turned on even in a case where paper is left on the center tray 41 or the side tray 42.

Figure 9:
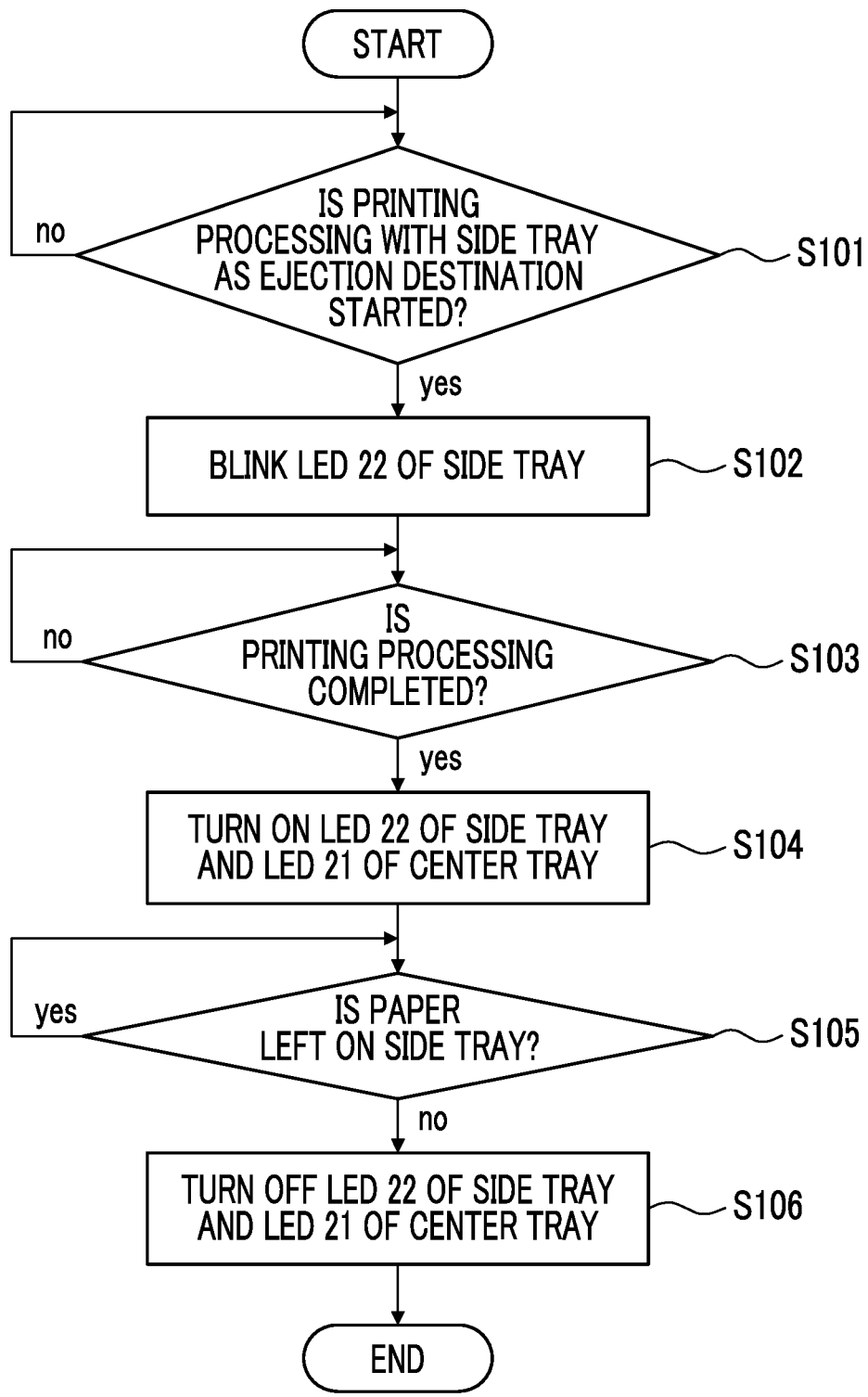
FIG. 9 is a flowchart for explaining the operation of ON control of the LEDs in a state where settings illustrated in FIG. 8 are performed.

The operation of the ON control of the LEDS in a state where the setting as illustrated in FIG. 8 is performed will be described with reference to the flowchart of FIG. 9. In addition, the flowchart of FIG. 9 illustrates the operation in a case where the printing processing is performed with the side tray 42 as an ejection destination.

In a case where the printing processing with the side tray 42 as an ejection destination is started in Step S101, the LED control unit 51 blinks the LED 22 of the side tray 42 in Step S102. Here, the LED control unit 51 causes the LED 22 to blink by a blinking method referred to as breathing such that a switching between ON and OFF is gradually made like gradation, instead of a blinking method in which ON/OFF of the LED 22 is simply repeated.

In addition, the LED 21 of the center tray 41 is neither blinked or turned on while paper is being ejected to such a side tray 42.

Then, in a case where the printing processing is completed in Step S103, the LED control unit 51 turns on both the LED 22 of the side tray 42 and the LED 21 of the center tray 41 in Step S104.

Then, the LED control unit 51 continues ON of such LEDs 21 and 22 as described above while the paper is left on the side tray 42 by the processing of Step S105.

Then, in a case where the paper is taken away from the side tray 42, the LED control unit 51 turns off both the LED 22 of the side tray 42 and the LED 21 of the center tray 41 in Step S106.

Next, how the ON state of the LEDs 21 and 22 changes during the printing processing and after the printing processing in a case where the printing processing with the side tray 42 as an ejection destination is executed by performing such a control will be described with reference to FIG. 10.

Figure 10:
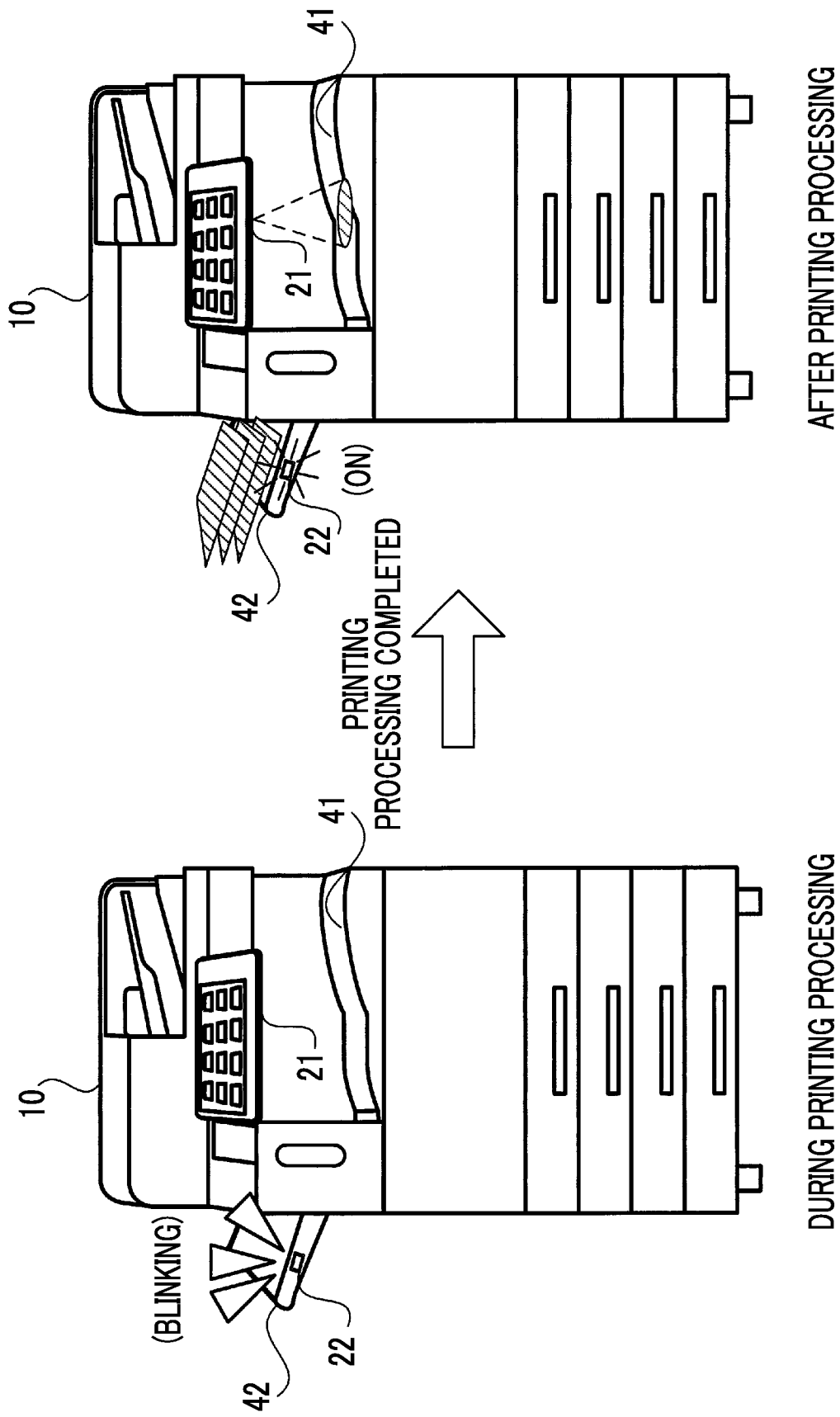
FIG. 10 is a view for explaining an ON state of the LEDs 21 and 22 during printing processing and after the printing processing in a case where the printing processing with the side tray 42 as an ejection destination is executed.

Referring to FIG. 10, it can be seen that, in a case where the printing processing is being executed, the LED 22 of the side tray 42 blinks and the LED 21 of the center tray 41 remains off. Then, in a case where the printing processing is completed, it can be seen that the LED 22 of the side tray 42 and the LED 21 of the center tray 41 are both brought into an ON state.

Figure 11:
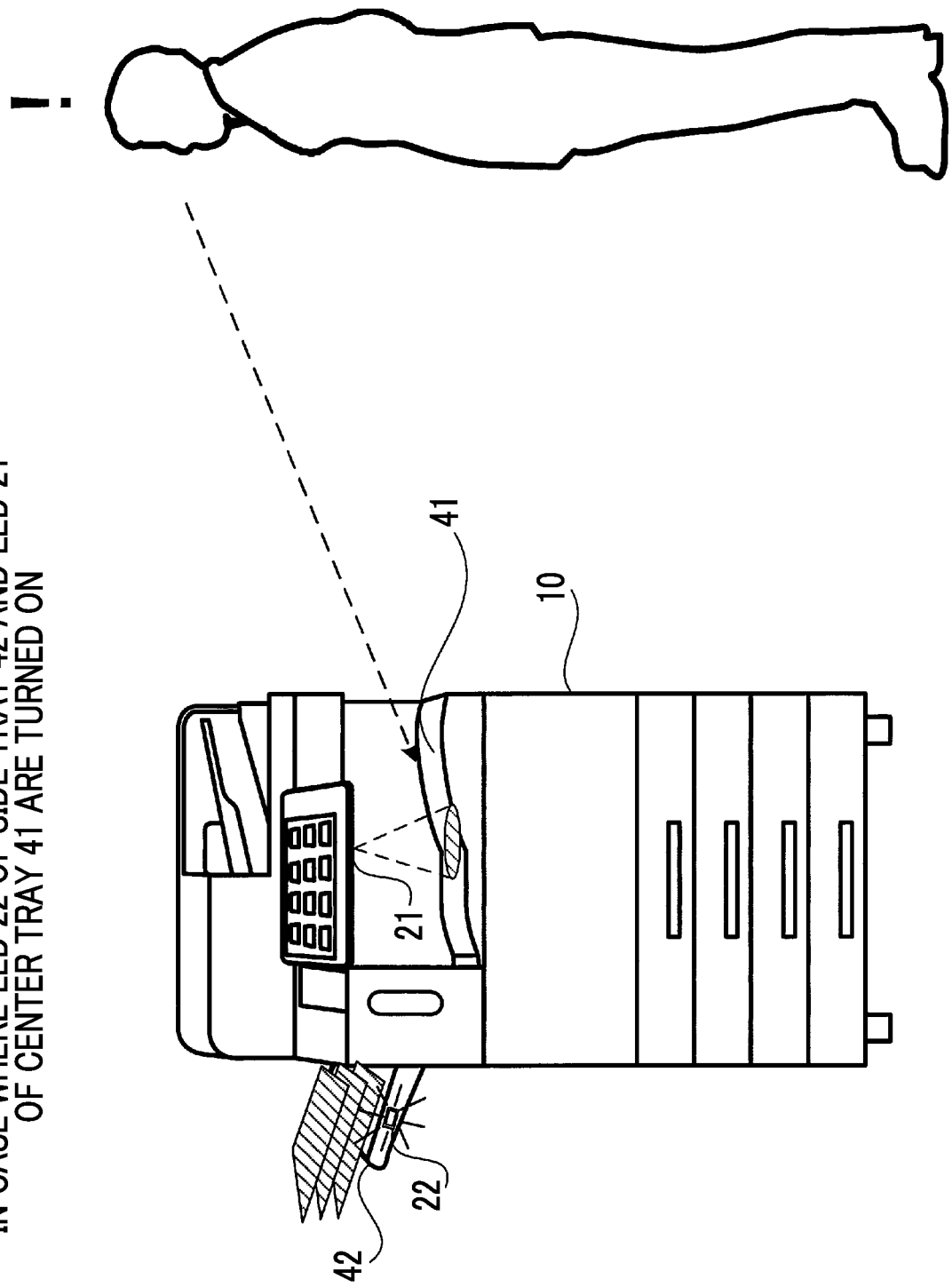
FIG. 11 is a view for explaining a state in which the LED 22 of the side tray 42 and the LED 21 of the center tray 41 are turned on in a case where paper is left on the side tray 42.

In this way, in a case where the setting as illustrated in FIG. 8 is performed and in a case where the paper is left on the side tray 42, as illustrated in FIG. 11, not only the LED 22 of the side tray 42 but also the center tray 41 will also continue being turned on.

For that reason, even a user at a position where the side tray 42 cannot be visually recognized, for example, on the right side of the image forming apparatus 10, can grasp that the forgotten-to-take paper is present on the side tray 42. For example, in a case where the side tray 42 is set as an ejection destination of the FAX reception, even a user at such a position where the user cannot visually recognize the LED 22 of the side tray 42 can grasp that the paper output by the FAX reception is present on the side tray 42.

Next, the operation of the ON control of the LEDs in a state where the setting as illustrated in FIG. 12 is performed will be described with reference to the flowchart of FIG. 13. In addition, since the flowchart of FIG. 13 is different from the flowchart of FIG. 9 only in that the processing of Steps S201 and S202 are added and Step S106 is replaced by Step S106a, only different processing will be primarily described.

In addition, in FIG. 12, the setting of turning on the LED 23 of the operation panel 43 in addition to the LED 21 of the center tray 41 and the LED 22 of the side tray 42 in a case where paper is left on the side tray 42 is also performed.

Figure 13:
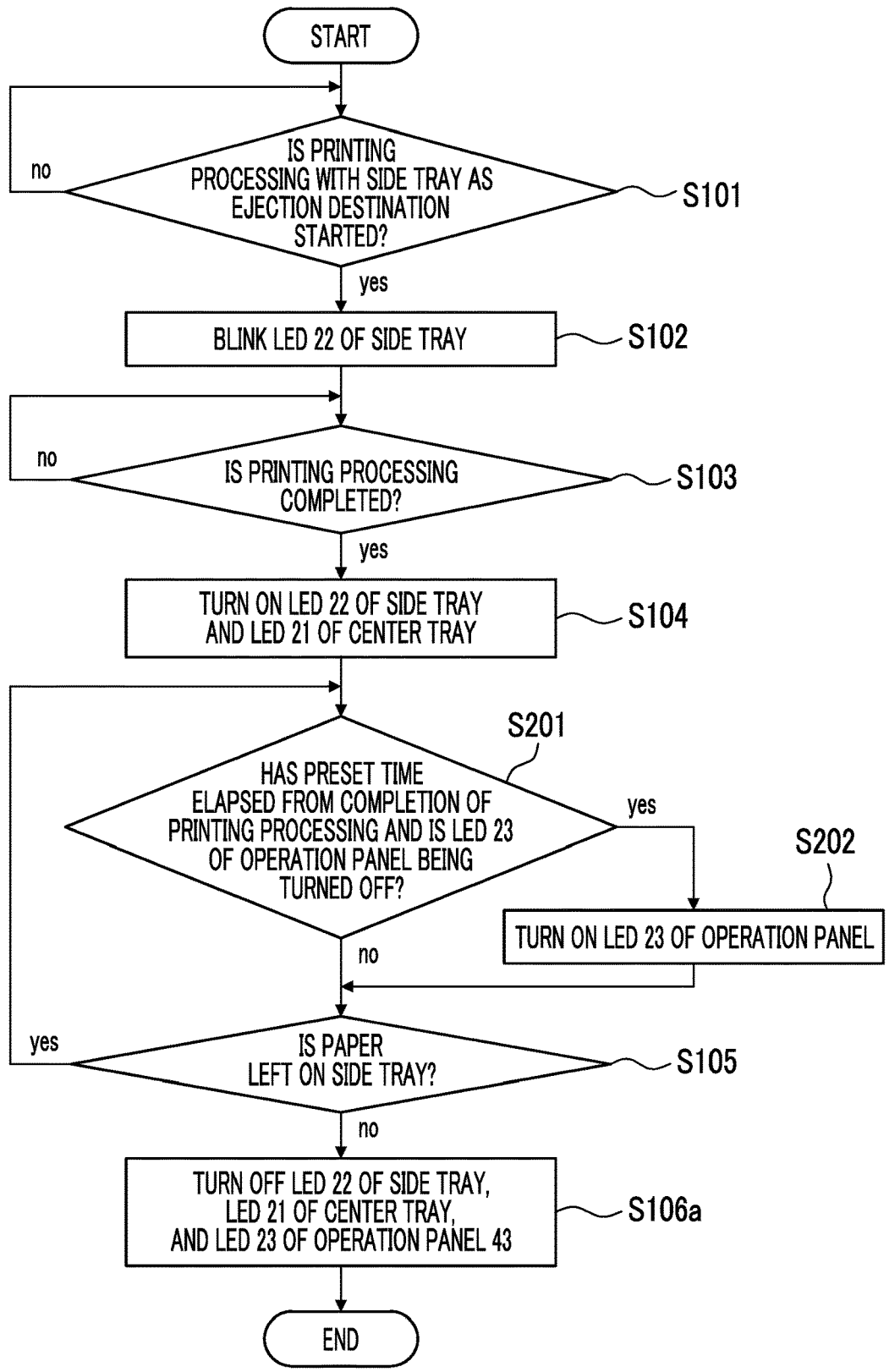
FIG. 13 is a flowchart for explaining the operation of the ON control of the LEDs in a state where the setting as illustrated in FIG. 12 is performed.

In the flowchart of FIG. 13, in a case where the printing processing with the side tray 42 as an ejection destination is started, the LED 22 blinks, and in a case where the printing processing is completed, the processing of Steps S101 to S104 until the LED 21 and the LED 22 are turned on are similar to the flowchart of FIG. 9.

Thereafter, in a case where the state in which the paper remains on the side tray 42 continues for, for example, 30 seconds, the LED control unit 51 performs control such that the LED 23 of the operation panel 43 is turned on by the processing of steps S201 and S202.

In addition, the LED 23 of the operation panel 43 is described here as being turned on in a case where a state in which paper is left on the side tray 42 continues for 30 seconds. However, the LED 23 of the operation panel 43 can be controlled to be turned on at the same timing as the LED 21 of the center tray 41.

Then, in a case where the paper is taken away from the side tray 42, the LED control unit 51 turns off all of the LED 22 of the side tray 42, the LED 21 of the center tray 41, and the LED 23 of the operation panel 43 in Step S106a.

In a case where the setting as illustrated in FIG. 12 is performed in this way and in a case where paper is left on the side tray 42, as illustrated in FIG. 11, not only the LED 22 of the side tray 42 but also the LED 21 of the center tray 41 continues being turned on, and in a case where a preset time has elapsed in a state where the paper is ejected to the side tray 42, the LED 23 on the operation panel 43 is also turned on as illustrated in FIG. 14.

Then, in a case where the operation panel 43 is raised by the tilt mechanism, the LED 23 of the operation panel 43 is turned on, so that a user who is farther away than in a case where the LED 21 of the center tray 41 is turned on can be notified of the event that paper is left on the side tray 42.

In addition, in a case where the LED 23 of the operation panel 43 is turned on as described above, the LED 21 of the center tray 41 may be turned off.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be appropriately changed.

Modification Example

In the above exemplary embodiments, a case where the LEDs are used as examples of the light emitting units has been described. However, the present invention is not limited to this. The present invention can be similarly applied to any light emitting unit having a light emitting function capable of performing a notification to a user by ON or blinking.

Additionally, in the above-described exemplary embodiments, the configuration has been described in which the LED 21 of the center tray 41 is turned on in a case where paper is left on the side tray 42. However, the present invention is not limited to such a configuration. For example, in a case where an LED is mounted on a lower part of the apparatus, that is, around the user's feet, and the paper is left on the side tray 42, the present invention can also be similarly applied to a case where a configuration where the LED mounted on the lower part of the apparatus is turned on.

Additionally, in the above exemplary embodiments, the side tray 42 is provided on the left side surface of the apparatus. However, the present invention is not limited to this. For example, the present invention can be similarly applied to a configuration in which the side tray 42 is provided on a right side surface of the apparatus. In this case, the side tray 42 is provided at a position where the side tray 42 cannot be visually recognized from a user at a specific position on the left side of the apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a first ejection destination and a second ejection destination to which a recording medium is ejected, wherein the first ejection destination is an ejection tray that is disposed in an apparatus body part and the second ejection destination is a side tray that is provided on a side of the apparatus body part;
a memory; and
a processor configured to perform control to turn on a first light emitting unit that is provided at the first ejection destination in a case where a recording medium ejected to the second ejection destination is left.

2. The image forming apparatus according to claim 1, further comprising:
a second light emitting unit that is provided at the second ejection destination,
wherein the processor is configured to turn on the second light emitting unit together with the first light emitting unit in a case where the recording medium ejected to the second ejection destination is left.

3. The image forming apparatus according to claim 2, wherein the processor is configured to turn on the first light emitting unit and the second light emitting unit in different ON modes.

4. The image forming apparatus according to claim 1, further comprising:
a third light emitting unit that is provided on an operation panel,
wherein the processor is configured to turn on the third light emitting unit in a case where a preset time has elapsed in a state where the recording medium is ejected to the second ejection destination.

5. The image forming apparatus according to claim 2, further comprising:
a third light emitting unit that is provided on an operation panel,
wherein the processor is configured to turn on the third light emitting unit in a case where a preset time has elapsed in a state where a recording medium is ejected to the second ejection destination.

6. The image forming apparatus according to claim 3, further comprising:
 a third light emitting unit that is provided on an operation panel,
 wherein the processor is configured to turn on the third light emitting unit in a case where a preset time has elapsed in a state where the recording medium is ejected to the second ejection destination.

7. The image forming apparatus according to claim 4, wherein the processor is configured to turn off the first light emitting unit in a case where the third light emitting unit is turned on.

8. The image forming apparatus according to claim 5, wherein the processor is configured to turn off the first light emitting unit in a case where the third light emitting unit is turned on.

9. The image forming apparatus according to claim 6, wherein the processor is configured to turn off the first light emitting unit in a case where the third light emitting unit is turned on.

10. The image forming apparatus according to claim 1, wherein the first ejection destination is disposed under an image reader on a central axis of the apparatus.

11. The image forming apparatus according to claim 1, further comprising:
 a distance measuring sensor that measures a distance from a user present on a front surface of the apparatus,
 wherein the processor is configured to control the first light emitting unit so as not to be turned on even in a case where the recording medium is left on the side tray in a case where the distance measuring sensor detects that a user is present within a preset distance from the apparatus.

12. The image forming apparatus according to claim 1, wherein the second ejection destination is disposed at a position which is less visually recognized from a surrounding user than the first destination.

13. The image forming apparatus according to claim 1, wherein the first light emitting unit irradiates the first ejection destination.

14. The image forming apparatus according to claim 1, wherein the processor is configured to control the first light emitting unit so as not to be turned on while the recording medium is being ejected to the second ejection destination.

* * * * *